US012812004B2

(12) United States Patent
Gao et al.

(10) Patent No.: US 12,812,004 B2
(45) Date of Patent: Nov. 24, 2026

(54) DATA SYNCHRONIZATION METHOD AND SERVER

(71) Applicant: Microfun Co., Ltd, Beijing (CN)

(72) Inventors: Chi Gao, Beijing (CN); Ming Tao, Beijing (CN); Wei Dong, Beijing (CN)

(73) Assignee: Microfun Co., Ltd, Beijing (CN)

( * ) Notice: Subject to any disclaimer, the term of this patent is extended or adjusted under 35 U.S.C. 154(b) by 99 days.

(21) Appl. No.: 18/628,129

(22) Filed: Apr. 5, 2024

(65) Prior Publication Data

US 2025/0141958 A1 May 1, 2025

(30) Foreign Application Priority Data

Oct. 25, 2023 (CN) ......................... 202311393654.0

(51) Int. Cl.
*H04L 67/1095* (2022.01)
*A63F 13/35* (2014.01)

(52) U.S. Cl.
CPC .......... *H04L 67/1095* (2013.01); *A63F 13/35* (2014.09)

(58) Field of Classification Search
CPC ...... H04L 67/1095; H04L 67/10; A63F 13/35; G06F 16/178; G06F 16/27; G06F 40/197; G06F 16/23; G06F 9/46; G06F 9/52; G06F 21/64
USPC .......................................................... 709/248
See application file for complete search history.

(56) References Cited

U.S. PATENT DOCUMENTS 6,317,754 B1 * 11/2001 Peng ........................ H04L 67/00 707/999.203
6,574,657 B1 * 6/2003 Dickinson ............... G06F 8/658 707/999.001
6,671,757 B1 * 12/2003 Multer ................ H04L 67/1095 710/1
6,694,336 B1 * 2/2004 Multer .................. G06F 16/182
(Continued)

FOREIGN PATENT DOCUMENTS

CN 108683718 A 10/2018
CN 112445783 A 3/2021
(Continued)

OTHER PUBLICATIONS

Notice of First Review Opinion for Chinese Patent Application No. 202311641773.3, dated Sep. 18, 2026.

*Primary Examiner* — Sargon N Nano

(57) ABSTRACT

The present disclosure provides a data synchronization method and a server, the method including: receiving a data synchronization request submitted by a client, determining whether a current version identification of a to-be-changed asset in the data synchronization request is a latest version identification; if yes, changing the to-be-changed asset according to an asset change information list in the data synchronization request to generate a changed target asset; generating a target version identification according to the current version identification and the changed target asset; sending status update prompt information to the client according to the target version identification to prompt the client to update the asset change information list; where the current version identification is a target version identification generated when data synchronization is performed on the to-be-changed asset last time. The method of the present disclosure improves the speed and security of data synchronization, and can ensure data consistency.

16 Claims, 6 Drawing Sheets

(56) References Cited

U.S. PATENT DOCUMENTS

| | | | | |
|---|---|---|---|---|
| 6,928,467 | B2 * | 8/2005 | Peng | H04L 67/5682 719/329 |
| 7,734,826 | B2 * | 6/2010 | Brown | G06F 16/1787 709/248 |
| 8,290,920 | B2 * | 10/2012 | Mahajan | A63F 13/00 707/703 |
| 8,538,923 | B2 * | 9/2013 | Xue | H04L 41/00 707/638 |
| 8,635,373 | B1 * | 1/2014 | Supramaniam | H04L 63/08 709/248 |
| 8,856,090 | B1 * | 10/2014 | Honner | G06Q 10/087 707/699 |
| 9,294,566 | B2 * | 3/2016 | Giampaolo | H04L 67/1095 |
| 9,805,050 | B2 * | 10/2017 | Smith | G06F 16/178 |
| 11,120,039 | B2 * | 9/2021 | Ying | G06F 16/11 |
| 2005/0177617 | A1 * | 8/2005 | Banginwar | H04L 69/329 709/203 |
| 2006/0242279 | A1 * | 10/2006 | Chen | H04W 8/24 709/221 |
| 2009/0198772 | A1 * | 8/2009 | Kim | H04L 67/02 709/203 |
| 2014/0317055 | A1 * | 10/2014 | Agrawal | G06F 16/273 707/627 |
| 2014/0351213 | A1 * | 11/2014 | Rundle | G06F 8/71 707/626 |
| 2015/0081633 | A1 * | 3/2015 | Su | G06F 16/27 707/634 |
| 2015/0120663 | A1 | 4/2015 | Le Scouarnec et al. | |
| 2016/0342671 | A1 * | 11/2016 | Leston | G06F 16/273 |
| 2023/0124659 | A1 * | 4/2023 | Hearnden | G06F 16/219 715/229 |
| 2023/0156081 | A1 * | 5/2023 | Boodman | H04L 67/568 709/248 |

FOREIGN PATENT DOCUMENTS

| | | | |
|---|---|---|---|
| CN | 114048217 | A | 2/2022 |
| CN | 115605863 | A | 1/2023 |
| CN | 116910156 | A | 10/2023 |

* cited by examiner

DATA SYNCHRONIZATION METHOD AND SERVER

CROSS-REFERENCE TO RELATED APPLICATIONS

This application claims priority to Chinese Patent Application No. 202311393654.0, filed on Oct. 25, 2023, which is hereby incorporated by reference in its entirety.

TECHNICAL FIELD

The present disclosure relates to the field of data processing, and in particular, to a data synchronization method and a server.

BACKGROUND

In a weak networking game, a client does not need to interact with a server in real time, but periodically synchronizes data when the client can connect to the network. Every time the data is synchronized, the client submits a change of core assets in the game to the server.

In an existing data synchronization solution, the client stores original assets, and when an asset change occurs, the client will generate changed full assets according to the original assets and asset variation, regardless of whether it is connected to the network or not. When a player is connected to the network, the client will upload the changed full assets to the server side for storage through a data synchronization request, and data synchronization requests will be distinguished by using time stamps as version numbers. However, such a data synchronization mode has the problems with the following aspects: in an aspect, the client needs to upload the full assets every time the data is synchronized, and an amount of data is large, resulting in a slow speed of data synchronization; in another aspect, since the changed full assets are calculated and generated by the client, the data on the client side is easy to be tampered with, resulting in poor data security; in yet another aspect, since the player may sometimes play the game by using multiple client devices, when the multiple client devices perform data synchronization operations at the same time, or one client device repeatedly submits data synchronization operations, the sequential order of multiple data synchronization operations cannot be identified when using the timestamps as the version numbers, and the server side cannot judge which piece of data is more reliable, and this may lead to an error in data synchronization, and cannot ensure data consistency between the client and the server side.

Therefore, a data synchronization solution that can implement data synchronization quickly and safely and ensure data consistency is required.

SUMMARY

The present disclosure provides a data synchronization method and a server to solve the technical problems that the existing data synchronization method has a slow data synchronization speed and poor security, and the data consistency between the client and the server side cannot be guaranteed.

In a first aspect, the present disclosure provides a data synchronization method, including:

receiving a data synchronization request submitted by a client, and determining whether a current version identification of a to-be-changed asset in the data synchronization request is a latest version identification;

if yes, changing the to-be-changed asset according to an asset change information list in the data synchronization request to generate a changed target asset;

generating a target version identification according to the current version identification and the changed target asset;

sending status update prompt information to the client according to the target version identification to prompt the client to update the asset change information list;

where the current version identification is a target version identification generated when data synchronization is performed on the to-be-changed asset last time.

In a possible implementation, the asset change information list includes an asset change item, and to-be-changed asset data, a scene identification and an asset change identification corresponding to each asset change item, changing the to-be-changed asset according to the asset change information list in the data synchronization request to generate the changed target asset specifically includes:

determining a current total asset of the to-be-changed asset;

for each asset change item in the asset change information list, determining the to-be-changed asset data, the scene identification and the asset change identification corresponding to the asset change item;

judging whether there exists in a database processing information corresponding to the asset change identification;

if not, merging and changing the current total asset according to the to-be-changed asset data and the scene identification corresponding to the asset change item to generate a sub-asset corresponding to the asset change item;

if yes, skipping the asset change item and recording the asset change identification corresponding to the asset change item;

generating the changed target asset according to the sub-asset corresponding to each asset change item.

In a possible implementation, merging and changing the current total asset according to the to-be-changed asset data and the scene identification corresponding to the asset change item to generate the sub-asset corresponding to the asset change item specifically includes:

determining a business logic corresponding to the scene identification of the asset change item, and judging whether the to-be-changed asset data corresponding to the asset change item is reasonable according to the business logic;

if the to-be-changed asset data corresponding to the asset change item is reasonable, merging and changing the current total asset according to the to-be-changed asset data to generate a sub-asset corresponding to the asset change item; and if the to-be-changed asset data corresponding to the asset change item is unreasonable, sending request-resubmission instruction information to the client, where the request-resubmission instruction information is used to instruct the client to regenerate a data synchronization request according to reasonable to-be-changed asset data.

In a possible implementation, after merging and changing the current total asset according to the to-be-changed asset data to generate the sub-asset corresponding to the asset change item, the method further includes:

generating an asset data processing identification according to the asset change identification corresponding to the to-be-changed asset data;

correspondingly, after generating the changed target asset according to the sub-asset corresponding to each asset change item, further including:

generating an asset data processing identification list according to each asset data processing identification.

In a possible implementation, after generating the target version identification according to the current version identification and the changed target asset, the method further includes:

recording the target version identification and the asset data processing identification list, and associating them with the data synchronization request.

In a possible implementation, sending the status update prompt information to the client according to the target version identification specifically includes:

obtaining a preset version identification in the data synchronization request, where the preset version identification is calculated by the client according to the asset change information list and the current total asset of the to-be-changed asset stored in the client;

judging whether the target version identification is consistent with the preset version identification;

if yes, generating first status update prompt information according to the target version identification and the asset data processing identification list, where the first status update prompt information is used to instruct the client to update the current version identification according to the target version identification and update the asset change information list according to the asset data processing identification list;

if not, generating second status update prompt information according to the target version identification, the changed target asset and the asset data processing identification list, where the second status update prompt information is used to instruct the client to update the current version identification according to the target version identification, update the current total asset of the to-be-changed asset stored in the client according to the changed target asset, and update the asset change information list according to the asset data processing identification list.

In a possible implementation, determining whether the current version identification of the to-be-changed asset in the data synchronization request is the latest version identification specifically includes:

obtaining a target version identification recorded in the server when the data synchronization is performed on the to-be-changed asset last time;

judging whether the current version identification is consistent with the target version identification recorded in the server when the data synchronization is performed last time;

if yes, the current version identification is the latest version identification;

if not, the current version identification is not the latest version identification.

In a possible implementation, when the current version identification is not the latest version identification, the method further includes:

determining the current total asset of the to-be-changed asset in the data synchronization request;

determining the target version identification and the asset data processing identification list recorded when the data synchronization is performed on the to-be-changed asset last time;

according to the current total asset of the to-be-changed asset, the target version identification and the asset data processing identification list recorded when the data synchronization is performed last time, generating third status update prompt information, where the third status update prompt information is used to instruct the client to:

update the current total asset of the to-be-changed asset stored in the client according to current total asset of the to-be-changed asset stored in the server; update the current version identification of the to-be-changed asset according to the target version identification recorded when the data synchronization is performed last time; update the asset change information list according to the updated current total asset of the to-be-changed asset in the client and the asset data processing identification stored in the client; generate a new preset version identification according to the updated current total asset of the to-be-changed asset and the updated asset change information list; and generate a new data synchronization request according to the new preset version identification, the updated asset change information list and the updated current version identification, and send the new data synchronization request to the server.

In a second aspect, the present disclosure provides a server, including:

a receiving module, configured to receive a data synchronization request submitted by a client;

a processing module, configured to determine whether a current version identification of a to-be-changed asset in the data synchronization request is a latest version identification; if yes, change the to-be-changed asset according to an asset change information list in the data synchronization request to generate a changed target asset; generate a target version identification according to the current version identification and the changed target asset; sending status update prompt information to the client according to the target version identification to prompt the client to update the asset change information list; where the current version identification is a target version identification generated when data synchronization is performed on the to-be-changed asset last time.

In a third aspect, the present disclosure provides a server, including: a processor and a memory communicatively connected to the processor;

where the memory stores computer execution instructions;

the processor executes the computer execution instructions stored in the memory to implement the above methods.

In a fourth aspect, the present disclosure provides a computer-readable storage medium storing computer execution instructions which, when executed by a processor, are used to implement the above methods.

In a fifth aspect, the present disclosure provides a computer program product including a computer program, which, when executed by a processor, implements the above methods.

The data synchronization method and the server provided by the present disclosure can receive a data synchronization request submitted by a client; determine whether a current version identification of a to-be-changed asset in the data synchronization request is a latest version identification; if yes, change the to-be-changed asset according to an asset change information list in the data synchronization request to generate a changed target asset; generate a target version identification according to the current version identification and the changed target asset; send status update prompt information to the client according to the target version identification to prompt the client to update the asset change information list; where the current version identification is a target version identification generated when data synchronization is performed on the to-be-changed asset last time. In the method of the present disclosure, the time stamp is no longer used as the version identification during data synchronization, but the version identification generated after the last data synchronization and the changed asset information are used to generate the current version identification of the data synchronization this time, that is, a result of the last data synchronization is used as a starting point of this data synchronization. By such setting, an evolution history of all versions of asset change can be traced by the server side, and the changed asset is calculated and generated by the server side, which makes it impossible for the client to change the asset without the server side's knowledge, and improves the security of data synchronization. Further, whether the current version identification of the to-be-changed asset in the data synchronization request is the latest version identification is determined, so that this data synchronization is the latest data update after the last data synchronization, that is, this data synchronization is performed by taking the last data synchronization as the starting point, and when multiple client devices perform data synchronization operations at the same time or a client device repeatedly operates, accurate data synchronization can be guaranteed, data consistency between the client and the server side can be ensured, and data synchronization errors can be avoided. Furthermore, since the result of the last data synchronization is taken as the starting point of this data synchronization, the traceability of data synchronization is ensured, and therefore, during each data synchronization, the client can upload only the asset change information list to the server side, and the server side can calculate the changed target asset during this data synchronization according to the changed asset information of the last data synchronization and the asset change information list. By such setting, the client only needs to upload the asset change information list during each data synchronization, and does not need to upload the full assets, which greatly reduces the amount of uploaded data and improves the speed of data synchronization.

BRIEF DESCRIPTION OF DRAWINGS

The accompanying drawings herein are incorporated into and form a part of the description, illustrate embodiments in accordance with the present disclosure, and are used to explain the principle of the present disclosure together with the description.

Figure 1:
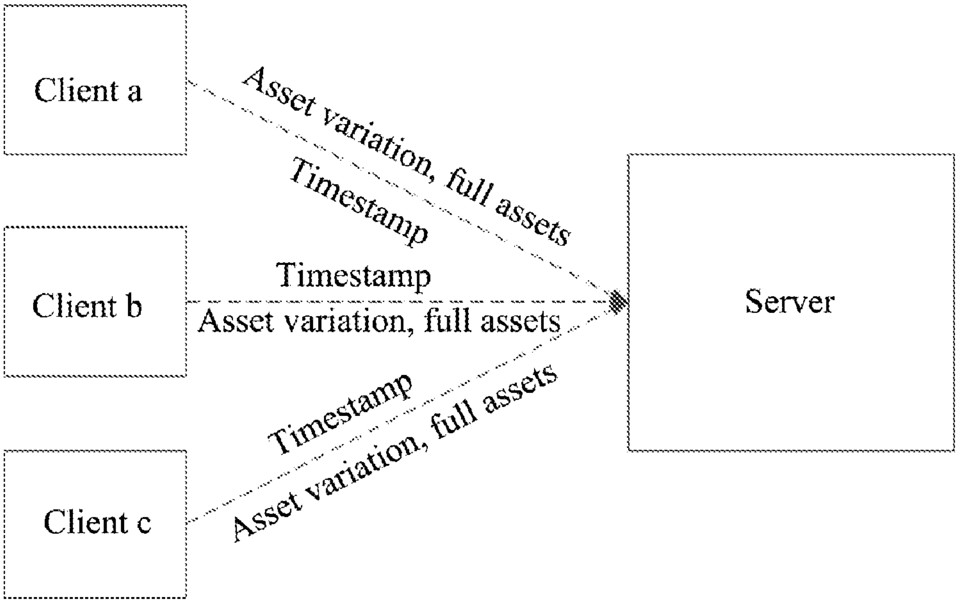
FIG. 1 is a schematic diagram of a data synchronization process in the prior art.

Through the above drawings, specific embodiments of the present disclosure have been shown, which will be described in more detail below. These drawings and textual descriptions are not intended to limit the scope of the concept of the present disclosure in any way, but to explain the concept of the present disclosure to those skilled in the art by referring to specific embodiments.

DESCRIPTION OF EMBODIMENTS

Reference will now be made in detail to illustrative embodiments, examples of which are illustrated in the accompanying drawings. When the following description refers to the drawings, unless otherwise indicated, the same number in different drawings indicate the same or similar elements. The embodiments described in the following exemplary embodiments do not represent all embodiments consistent with the present disclosure. On the contrary, they are merely examples of apparatuses and methods consistent with some aspects of the present disclosure as detailed in the appended claims.

It should be noted that the data synchronization method and the server of the present disclosure can be used in the field of data processing, and can also be used in any field other than the field of data processing, such as the field of game technology. The application fields of the data synchronization method and the server in the present disclosure are not limited.

First, terms involved in the present disclosure are explained:

Delta refers to an asset change item, which represents a change of a certain item in assets;

Delta list refers to a list of asset change information, which consists of all asset change items and represents all asset changes that need to be made during the data synchronization this time;

Client base refers to the full assets stored by the client;

Back-end base refers to the full assets stored by the server side.

In the weak networking game, the client does not need to interact with the server in real time, but periodically synchronizes the data when the client can connect to the network. Every time the data is synchronized, the client submits the change of core assets in the game to the server.

In an existing data synchronization solution, the client stores original assets, and when an asset change occurs, the client will generate the changed full assets according to the original assets and the asset variation, regardless of whether it is connected to the network or not. When the player is connected to the network, the client will upload the changed full assets to the server side for storage through the data synchronization request, and data synchronization requests are distinguished by using the time stamps as the version numbers.

However, such a data synchronization mode has the problems with the following aspects: in an aspect, the client needs to upload the full assets every time the data is synchronized, and an amount of data is large, resulting in a slow speed of data synchronization; in another aspect, since the changed full assets are calculated and generated by the client, the data on the client side is easy to be tampered with, resulting in poorer data security; in yet another aspect, since the player may sometimes play the game by using multiple client devices, when the multiple client devices perform data synchronization operations at the same time, or one client device repeatedly submits data synchronization operations, the sequential order of multiple data synchronization operations cannot be identified when using the timestamp as the version number, and the server side cannot judge which piece of data is more reliable, and this may lead to the error in the data synchronization, and cannot ensure data consistency between the client and the server side.

FIG. 1 is a schematic diagram of a data synchronization process in the prior art. As shown in FIG. 1, a player plays a game offline by using three client devices at the same time. After connecting to the network, clients a, b and c simultaneously send data synchronization requests to the server, and the data synchronization requests include timestamps, full assets and asset variation. According to the time stamps, the server identifies which client's data synchronization request is to be used for data synchronization, and updates asset information stored in the server according to the full assets and the asset variation during data synchronization. However, because clients a, b and c send the data synchronization requests to the server at the same time, the time stamps are the same, and the server cannot determine which client's data synchronization request is used for data synchronization. At the same time, the full assets sent by the client have been tampered with and the amount of data is large, which leads to poor data security and slow data synchronization.

Based on this technical problem, the inventive concept of this application lies in how to provide a data synchronization method that can implement data synchronization quickly and safely and ensure data consistency.

Specifically, a data synchronization request submitted by a client can be received; whether a current version identification of a to-be-changed asset in the data synchronization request is a latest version identification can be determined; if yes, the to-be-changed asset can be changed according to an asset change information list in the data synchronization request to generate a changed target asset; a target version identification can be generated according to the current version identification and the changed target asset; and status update prompt information can be sent to the client according to the target version identification to prompt the client to update the asset change information list; where the current version identification is a target version identification generated when data synchronization is performed on the to-be-changed asset last time. In the method of the present disclosure, the time stamp is no longer used as the version identification during data synchronization, but the version identification generated after the last data synchronization and the changed asset information are used to generate the current version identification of the data synchronization this time, that is, a result of the last data synchronization is used as a starting point of this data synchronization. By such setting, an evolution history of all versions of asset change can be traced by the server side, and the changed asset is calculated and generated by the server side, which makes it impossible for the client to change the asset without the server side's knowledge, and improves the security of data synchronization. Further, whether the current version identification of the to-be-changed asset in the data synchronization request is the latest version identification is determined, so that this data synchronization is the latest data update after the last data synchronization, that is, this data synchronization is performed by taking the last data synchronization as the starting point, and when multiple client devices perform data synchronization operations at the same time or a client device repeatedly operates, accurate data synchronization can be guaranteed, data consistency between the client and the server side can be ensured, and data synchronization errors can be avoided. Furthermore, since the result of the last data synchronization is taken as the starting point of this data synchronization, the traceability of data synchronization is ensured, and therefore, during each data synchronization, the client can upload only the asset change information list to the server side, and the server side can calculate the changed target asset during this data synchronization according to the changed asset information of the last data synchronization and the asset change information list. By such setting, the client only needs to upload the asset change information list during each data synchronization, and does not need to upload the full assets, which greatly reduces the amount of uploaded data and improves the speed of data synchronization.

The technical solution of the present disclosure and how the technical solution of the present disclosure solves the above technical problems will be described in detail below with specific embodiments. The following specific embodiments can be combined with each other, and the same or similar concepts or processes may not be repeated in some embodiments. Embodiments of the present disclosure will be described below with reference to the accompanying drawings.

Embodiment 1

Figure 2:
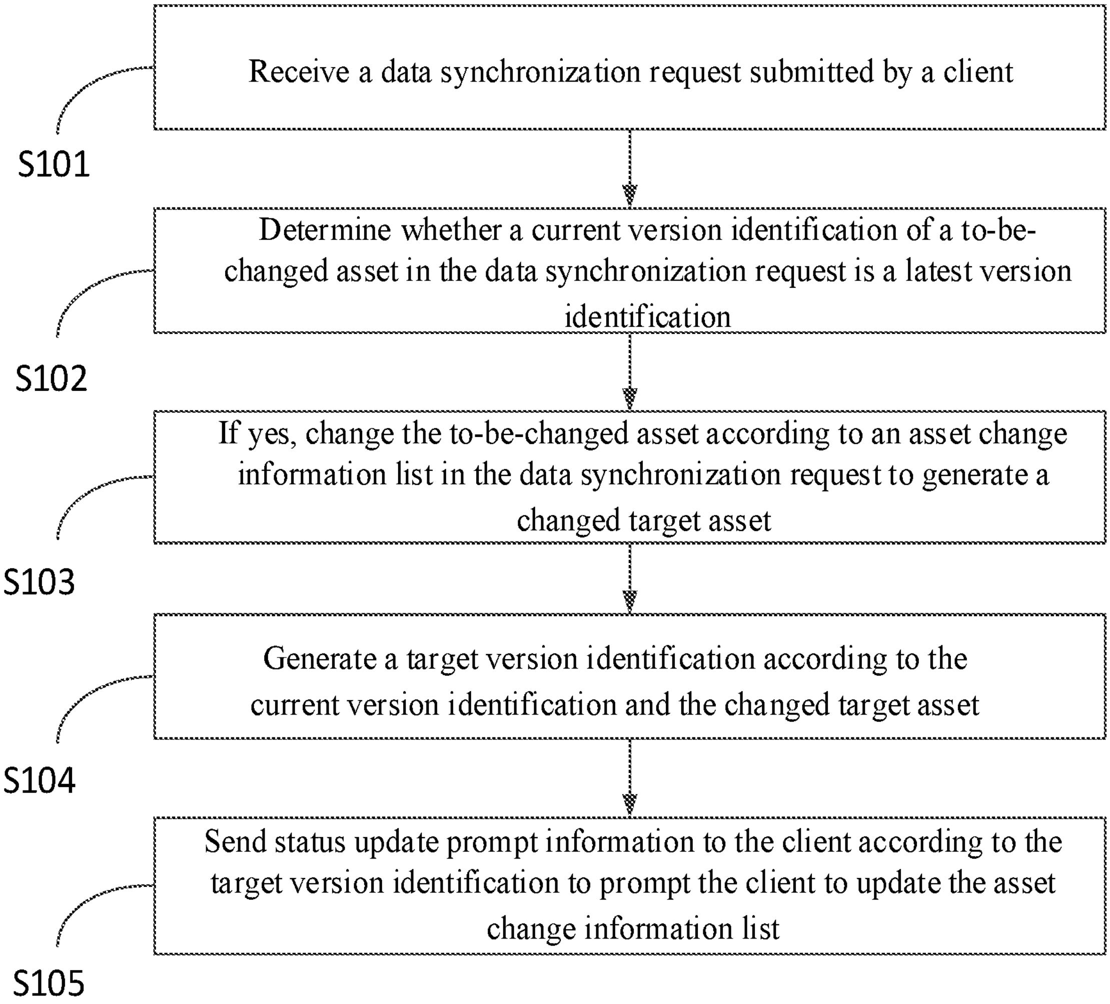
FIG. 2 is a flowchart of a data synchronization method according to an embodiment of the present disclosure.

FIG. 2 is a flowchart of a data synchronization method according to an embodiment of the present disclosure, and this embodiment takes a server as an execution subject to explain the data synchronization method. As shown in FIG. 2, the data synchronization method can include the following steps.

S101, receive a data synchronization request submitted by a client.

In this embodiment, the client may be a terminal device such as a mobile phone, a tablet, a smart phone, etc. The specific type of the client can be flexibly set by those skilled in the art, which is not limited here.

S102, determine whether a current version identification of a to-be-changed asset in the data synchronization request is a latest version identification.

In this embodiment, for the above step S102 of determining whether the current version identification of the to-be-changed asset in the data synchronization request is the latest version identification, reference can be made to Embodiment 2 for details.

In this embodiment, the latest version identification can be a latest generated version identification stored in the server.

In this embodiment, the current version identification in step S102 can be a target version identification generated when data synchronization is performed on the to-be-changed asset last time.

In this embodiment, the version identification can be a unique identification that can distinguish between different asset change versions. The version identification may exist in a form of version number, and of course, it may also exist in other forms, which is not limited here.

In this embodiment, a user generally logs in to the client through information such as a user name and a mobile phone number to play games and generate an asset change, and therefore, the to-be-changed asset can be the asset corresponding to the user who is logging in to the client.

S103, if yes, change the to-be-changed asset according to an asset change information list in the data synchronization request to generate a changed target asset.

In this embodiment, the asset change information list can include an asset change item, and to-be-changed asset data, a scene identification and an asset change identification corresponding to each asset change item.

In this embodiment, the asset change identification can be a unique identification for judging whether the to-be-changed asset data and the asset change item have changed, and the scenario identification can be a unique identification for identifying a business scenario of the asset change item.

In a possible implementation, changing the to-be-changed asset according to the asset change information list in the data synchronization request to generate the changed target asset in the above step S103 can include:

- S1031, determine a current total asset of the to-be-changed asset;
- S1032, for each asset change item in the asset change information list, determine the to-be-changed asset data, the scene identification and the asset change identification corresponding to the asset change item;
- S1033, judge whether there exists in a database processing information corresponding to the asset change identification;
- S1034, if yes, skip the asset change item and record the asset change identification corresponding to the asset change item;
- S1035, if not, merge and change the current total asset according to the to-be-changed asset data and the scene identification corresponding to the asset change item to generate a sub-asset corresponding to the asset change item;
- S1036, generate the changed target asset according to the sub-asset corresponding to each asset change item.

In this implementation, the current total asset of the to-be-changed asset can be the total asset corresponding to the to-be-changed asset currently stored in the server, that is, the total asset generated after the data synchronization is performed on the to-be-changed asset last time.

In this implementation, each asset change item includes its corresponding to-be-changed asset data (delta array), scene identification (scene) and asset change identification (commit array, commitId), where the scene is the unique identification of the business scene corresponding to the asset change item, the delta array is the content of asset change that takes places in the corresponding business scene, and the commit array is the unique identification of the corresponding asset change.

In this implementation, the asset change identification (commit array) is used to verify whether the corresponding asset change item was processed before this synchronization, and the to-be-changed asset data (delta array) is used to calculate and change the asset item corresponding to this asset change item after the verification is passed, the scene identification (scene) is used to allow the server side to find a corresponding business logic according to a business scene, so as to judge, according to the business logic, whether the to-be-changed asset data is reasonable, and the business logic of each scene is unique and extensible.

In this implementation, when processing a delta, the server side verifies whether a commitID corresponding to the delta has been processed in a back-end database, and does not merge the delta that has been processed, and if the delta is not processed by the backend, the verified delta is merged to the backend base.

In this implementation, when data synchronization is implemented based on delta (asset change item) in a weak networking environment, the first thing to consider is that delta data is not uploaded to the server side in real time, and a reasonable upload mode for delta needs to be designed. Therefore, each asset change item is provided with the corresponding to-be-changed asset data (delta array), scene identification (scene), and asset change identification (commit array), so as to ensure that the delta of the client can reach the server uniquely and orderly, thereby improving the orderliness and accuracy of data synchronization. Further, because the client data may have been tampered with, or the client may have a fault when generating the asset change information list, asset change items that have been processed before may appear in the asset change information list. Therefore, before the current total asset is merged and changed according to the to-be-changed asset data, it is also necessary to use the asset change identification corresponding to the asset change item for verification, and only after the verification is passed (the asset change item has not been processed before) can the asset merging and changing be performed, thus further improving the security of data synchronization. Further, if the verification of the asset change identification is not passed, it means that the corresponding asset change item has been processed before, and at this time, it is needed to skip the asset change item and record the asset change identification corresponding to the asset change item, so as to find out the cause of the occurrence of the error according to the asset change identification and correct it later.

In a possible implementation, merging and changing the current total asset according to the to-be-changed asset data and the scene identification corresponding to the asset change item to generate the sub-asset corresponding to the asset change item in the above step S1035 can include:

S51, determine a business logic corresponding to the scene identification of the asset change item, and judge whether the to-be-changed asset data corresponding to the asset change item is reasonable according to the business logic.

S52, if the to-be-changed asset data corresponding to the asset change item is reasonable, merge and change the current total asset according to the to-be-changed asset data to generate a sub-asset corresponding to the asset change item.

S53, if the to-be-changed asset data corresponding to the asset change item is unreasonable, send request-resubmission instruction information to the client, where the request-resubmission instruction information is used to instruct the client to regenerate a data synchronization request according to reasonable to-be-changed asset data.

In this implementation, each asset change item corresponds to a business scene, and the scene identification (scene) is the unique identification of the business scene corresponding to the asset change item. Each scene identification (scene) corresponds to a business logic to judge whether the to-be-changed asset data of the asset change item is reasonable. Those skilled in the art can set a corresponding business logic for each scene identification (scene) in advance according to actual situations, that is, establish a correspondence table between scene(s) and business logic(s), and after determining the scene identification of the asset change item, the corresponding business logic can be accurately determined according to the correspondence table.

In this implementation, if the verification of the asset change identification is passed (the asset change item has not been processed before), asset merging and changing can be performed for the asset change item. However, before changing the asset, it is necessary to check whether the to-be-changed asset data is reasonable according to the business logic corresponding to the scene identification of the asset change item. If the to-be-changed asset data is unreasonable, it is necessary to notify the client to regenerate the data synchronization request according to reasonable to-be-changed asset data. Through this setting, the security and accuracy of data synchronization can be further improved and the smooth progress of data synchronization can be ensured.

S104, generate a target version identification according to the current version identification and the changed target asset.

In this embodiment, the target version identification (curVer) can include a current version identification (starVer, that is, a target version identification generated in the last synchronization) and a target asset (curStatus) after the current change, and the target asset (curStatus) can be an asset snapshot stored by the server after this synchronization. Each time the data is synchronized, a hash calculation may be performed on the startVer and the curStatus to obtain a corresponding curVer. The curVer allows this asset synchronization to continue from the previous one and serve as a starting point for the next synchronization, and uniquely represents the current final status of all assets after this synchronization. By such setting, the latest version identification can be calculated at the server side according to this step for each asset change synchronization of the client, so the version identification can automatically move forwards after each synchronization, so that the synchronization can be continued selectively from the last synchronization point, and key information of the latest synchronization can be recorded at the server side, and thus the function of tracing the evolution history can be controlled and implemented by the server side, and the client cannot change the assets without the knowledge of the server side, thereby improving the security of data synchronization.

Figure 3:
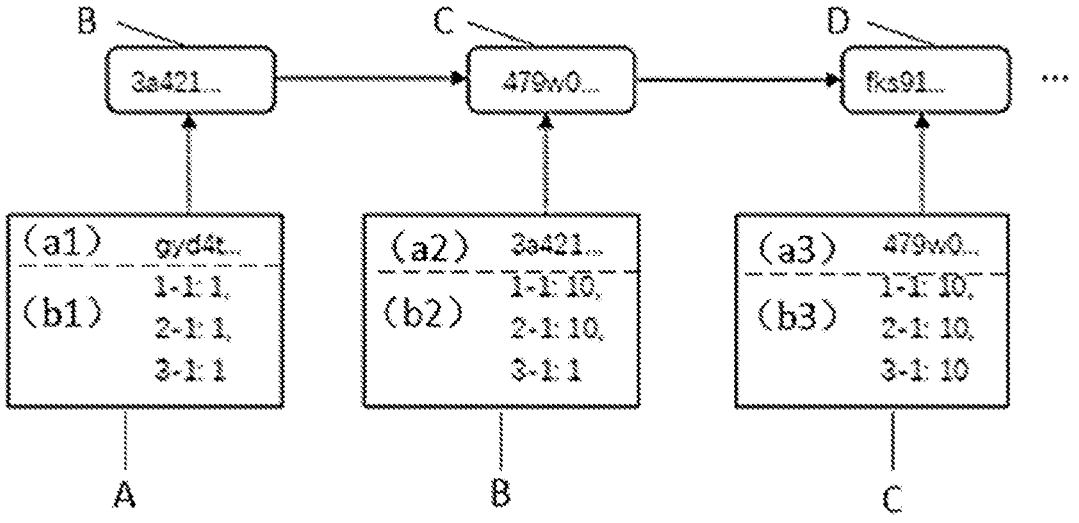
FIG. 3 is a schematic diagram of a generation process of a version identification according to an embodiment of the present disclosure.

Illustratively, FIG. 3 is a schematic diagram of a generation process of a version identification according to an embodiment of the present disclosure. As shown in FIG. 3, A represents a target version identification generated after the N-th data synchronization, where (a1) represents a target version identification generated after the (N−1)-th data synchronization and (b1) represents a target asset generated after the N-th data synchronization. B represents a target version identification generated after the (N+1)-th data synchronization, where (a2) represents a target version identification generated after the N-th data synchronization and (b2) represents a target asset generated after the (N+1)-th data synchronization. C represents a target version identification generated after the (N+2)-th data synchronization, where (a3) represents a target version identification generated after the (N+1)-th data synchronization and (b3) represents a target asset generated after the (N+2)-th data synchronization. Then, by analogy, the target version identification curVer allows this asset synchronization to continue from the previous one and serve as the starting point for the next synchronization, and uniquely represents the current final status of all assets after this synchronization. The target version identification curVer will automatically move forward after each synchronization.

In a possible implementation, after the step S1035 of merging and changing the current total asset according to the to-be-changed asset data and the scene identification corresponding to the asset change item to generate the sub-asset corresponding to the asset change item, it further includes: generating an asset data processing identification according to the asset change identification corresponding to the to-be-changed asset data.

Correspondingly, after generating the changed target asset according to the sub-asset corresponding to each asset change item in the above step S1036, it may further include: generating an asset data processing identification list according to each asset data processing identification.

In a possible implementation, after processing a delta (merging the delta array into the back-end base), the server generates an asset data processing identification (commitEnd) according to the asset change identification (commitId) corresponding to the to-be-changed asset data, which can be: reset the return value commitEnd=commitId in the response.

In this implementation, after the current total asset is merged and changed according to the to-be-changed asset data, the asset change identification corresponding to the to-be-changed asset data needs to be processed to generate an asset data processing identification to indicate that the asset change item corresponding to the to-be-changed asset data has been processed, so as to facilitate the subsequent verification of data synchronization and further improve the security of data synchronization. Further, after obtaining the asset data processing identification corresponding to each asset change item, an asset data processing identification list can be generated according to each asset data processing identification, so as to facilitate the subsequent update of the client asset change information list and further improve the consistency of data synchronization.

In a possible implementation, after generating the target version identification according to the current version identification and the changed target asset in the above step S104, it further includes: recording the target version identification and the asset data processing identification list, and associating them with the data synchronization request.

In this implementation, after the target version identification is generated, the target version identification and the asset data processing identification list can also be recorded, so that the subsequent data synchronization process can be verified and corrected according to the recorded target version identification and asset data processing identification list during subsequent data synchronization, and the consistency and security of data synchronization can be further improved. Furthermore, associating the target version identification and the asset data processing identification list with the data synchronization request is to bring the data of each data synchronization process together, so as to facilitate data search and differentiation.

S105, send status update prompt information to the client according to the target version identification to prompt the client to update the asset change information list.

In a possible implementation, sending the status update prompt information to the client according to the target version identification in step S105 can include:

S1051, obtain a preset version identification in the data synchronization request, where the preset version identification is calculated by the client according to the asset change information list and the current total asset of the to-be-changed asset stored in the client;

S1052, judge whether the target version identification is consistent with the preset version identification;

S1053, if yes, generate first status update prompt information according to the target version identification and the asset data processing identification list, where the first status update prompt information is used to instruct the client to update the current version identification according to the target version identification and update the asset change information list according to the asset data processing identification list;

S1054, if not, generate second status update prompt information according to the target version identification, the changed target asset and the asset data processing identification list, where the second status update prompt information is used to instruct the client to update the current version identification according to the target version identification, update the current total asset of the to-be-changed asset stored in the client according to the changed target asset, and update the asset change information list according to the asset data processing identification list.

In this implementation, the preset version identification can be calculated by the client according to the asset change information list and the current total asset of the to-be-changed asset stored in the client, and the specific calculation process is similar to the process of hash calculation performed by the server to obtain the target version identification, so the details are not repeated here.

In this implementation, if the target version identification is consistent with the preset version identification, the server will send the target version identification and the asset data processing identification list to the client, so that the client updates the current version identification and the asset change information list to use them as the starting point of the next data synchronization. If the target version identification is inconsistent with the preset version identification, it means that the asset data in the client has been tampered with or there is a BUG, and the server will also send the changed target asset (back-end base) to the client, so that the client can change a client base according to the back-end base.

In this implementation, if the target version identification is inconsistent with the preset version identification, the server can also define additional information subInfo for each scene to explain the specific cause and intention of the current change and that the server has made a reasonable merging process according to the business logic, so as to inform the user to find the cause of the client error.

In this implementation, the preset version identification is calculated by the client according to the asset change information list and the current total asset of the to-be-changed asset stored in the client, while the target version identification is calculated by the server according to the asset change information list and the current total asset of the to-be-changed asset stored in the server. If the target version identification is consistent with the preset version identification, it means that there is no problem with the asset data in the client; if the target version identification is inconsistent with the preset version identification, it means that the asset data in the client has been tampered with or has a BUG. When there is a problem with the asset data in the client, it is necessary to modify and correct the asset data in the client according to the asset data in the server. By this setting, the security and consistency of data synchronization can be further improved. Furthermore, updating the asset change information list according to the asset data processing identification list can clear the asset change item that has been processed in the client, ensure that the client can maintain the asset change information list synchronously with the server, and further improve the consistency of data synchronization.

In the method of the present disclosure, the time stamp is no longer used as the version identification during data synchronization, but the version identification generated after the last data synchronization and the changed asset information are used to generate the current version identification of the data synchronization of this time, that is, a result of the last data synchronization is used as the starting point of this data synchronization. By such setting, an evolution history of all versions of asset change can be traced by the server side, and the changed asset is calculated and generated by the server side, which makes it impossible for the client to change the asset without the knowledge of the server side, and improves the security of data synchronization. Further, whether the current version identification of the to-be-changed asset in the data synchronization request is the latest version identification is determined, so that this data synchronization is the latest data update after the last data synchronization, that is, this data synchronization is performed by taking the last data synchronization as the starting point, and when multiple client devices perform data synchronization operations at the same time or a client device repeatedly operates, accurate data synchronization can be guaranteed, data consistency between the client and the server side can be ensured, and data synchronization error can be avoided. Furthermore, since the result of the last data synchronization is taken as the starting point of this data synchronization, the traceability of data synchronization is ensured, and therefore, during each data synchronization, the client can upload only the asset change information list to the server side, and the server side can calculate the changed target asset during this data synchronization according to the changed asset information of the last data synchronization and the asset change information list. By such setting, the client only needs to upload the asset change information list during each data synchronization, and does not need to upload the full assets, which greatly reduces the amount of uploaded data and improves the speed of data synchronization.

In the following, the implementation of determining whether the current version identification of the to-be-changed asset in the data synchronization request is the latest version identification in step S102 of the above Embodiment 1 is described in detail with a specific embodiment 2.

Embodiment 2

Figure 4:
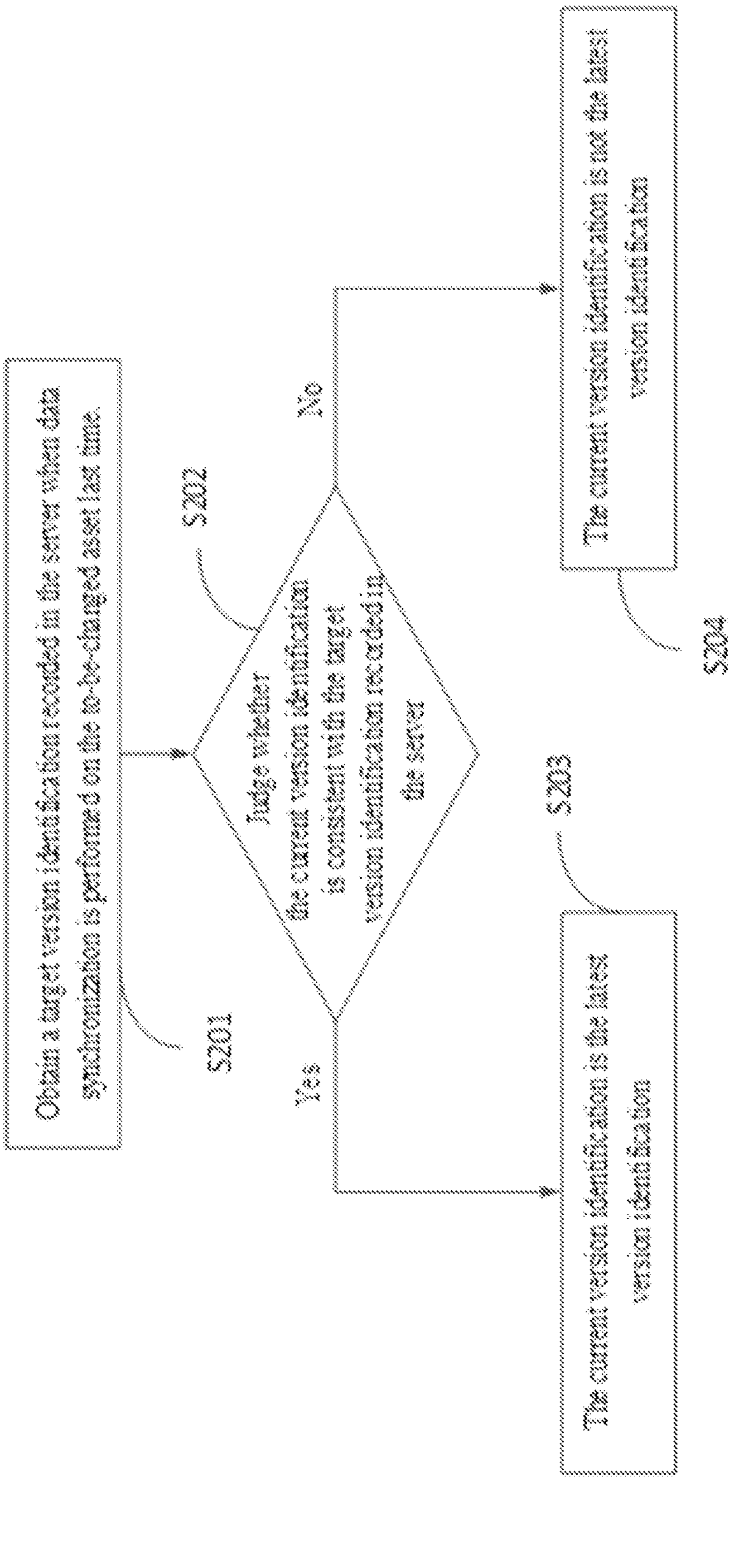
FIG. 4 is a flowchart of a data synchronization method according to another embodiment of the present disclosure.

FIG. 4 is a flowchart of a data synchronization method according to another embodiment of the present disclosure, and this embodiment takes a server as an execution subject to explain the data synchronization method. As shown in FIG. 4, the data synchronization method can include the following steps.

S201, obtain a target version identification recorded in the server when data synchronization is performed on the to-be-changed asset last time.

In this embodiment, the target version identification recorded when the data synchronization is performed on the to-be-changed asset last time, i.e., the latest version identification generated by the server after the last data synchronization, can be obtained from a database of the server.

S202, judge whether the current version identification is consistent with the target version identification recorded in the server when the data synchronization is performed last time.

S203, if yes, the current version identification is the latest version identification.

In this embodiment, when the client is the device that performed the last data synchronization, reference can be made to steps S103-S105 in Embodiment 1 for details of the specific process of data synchronization.

S204, if not, the current version identification is not the latest version identification.

In this embodiment, when a player plays a game by using multiple clients, and the multiple clients perform data synchronization operations at the same time, or a player plays a game by using only one client, but the client repeatedly submits data synchronization operations, the server will receive multiple data synchronization requests. By judging whether the current version identification in the data synchronization request is the latest version identification, the latest data update after the last data synchronization can be found from the multiple data synchronization requests, thereby ensuring the traceability and accuracy of data synchronization.

In a possible implementation, when the current version identification is not the latest version identification, it may further include:

S1, determine the current total asset of the to-be-changed asset in the data synchronization request;

S2, determine the target version identification and the asset data processing identification list recorded when the data synchronization is performed on the to-be-changed asset last time;

S3, according to the current total asset of the to-be-changed asset, the target version identification and the asset data processing identification list recorded when the data synchronization is performed last time, generate third status update prompt information, where the third status update prompt information is used to instruct the client to perform the following steps (1)-(5):

(1) the client updates the current total asset of the to-be-changed asset stored in the client according to current total asset of the to-be-changed asset stored in the server;

(2) the client updates the current version identification of the to-be-changed asset according to the target version identification recorded when the data synchronization is performed last time;

(3) the client updates the asset change information list according to the updated current total asset of the to-be-changed asset in the client and the asset data processing identification stored in the client;

(4) the client generates a new preset version identification according to the updated current total asset of the to-be-changed asset and the updated asset change information list;

(5) the client generates a new data synchronization request according to the new preset version identification, the updated asset change information list and the updated current version identification, and sends it to the server.

In this implementation, when the server receives multiple data synchronization requests at the same time, in the synchronization protocol, the server records the version identification of the latest synchronization, and only the data synchronization request including the latest synchronization delta can successfully continue to submit changes to the server, and for the submissions of other data synchronization requests, the clients will be informed that the latest delta has been merged into the server, and the client needs to grab the latest curVer and curStatus from the server before continuing asset synchronization. At the same time, the client corresponding to the data synchronization request will also be informed that it needs to obtain, from the server, commitEnd recorded during the latest synchronization to ensure that the client can update a delta list, so as to submit this synchronization request after the delta it submitted last time.

In this implementation, when the current version identification in the data synchronization request is not the latest version identification, the server needs to synchronize information, such as the current total asset of the to-be-changed asset, the target version identification and the asset data processing information list recorded when the data synchronization is performed last time, to the client corresponding to the data synchronization request, so that the client can update and correct the data. By this setting, when the user switches devices or submits repeatedly, the client can merge the delta from the server which is submitted by other devices or previously submitted by this device, and synchronize to the latest asset information according to the server, so as to ensure the data consistency between the front-end and the back-end, and further ensure the smooth progress of the data synchronization of this time.

In this embodiment, since the player sometimes plays the game by using multiple clients, when the multiple clients perform data synchronization operations at the same time, a situation may occur that a client that performed the last data synchronization needs to be identified from the multiple clients. In addition, when the player plays the game by using only one client, it may also occur a situation where the client repeatedly submits data synchronization operations. Therefore, it is necessary to use the target version identification recorded in the server when the data synchronization is performed last time to identify the latest one from multiple data synchronization operations as the data synchronization operation of this time. By such setting, this data synchronization is the latest data update after the last data synchronization, that is, this data synchronization is performed by taking the last data synchronization as the starting point, and when multiple client devices perform data synchronization operations at the same time or a client device repeatedly operates, accurate data synchronization can be guaranteed, data consistency between the client and the server side can be ensured, and data synchronization error can be avoided. Furthermore, by judging whether the current version identification uploaded by the client is consistent with the target version identification recorded in the last data synchronization stored in the server, it can be simply and accurately determined whether the current version identification of the to-be-changed asset in the data synchronization request is the latest version identification.

In the following, the data synchronization method of the present disclosure will be described with a specific embodiment.

Embodiment 3

Figure 5:
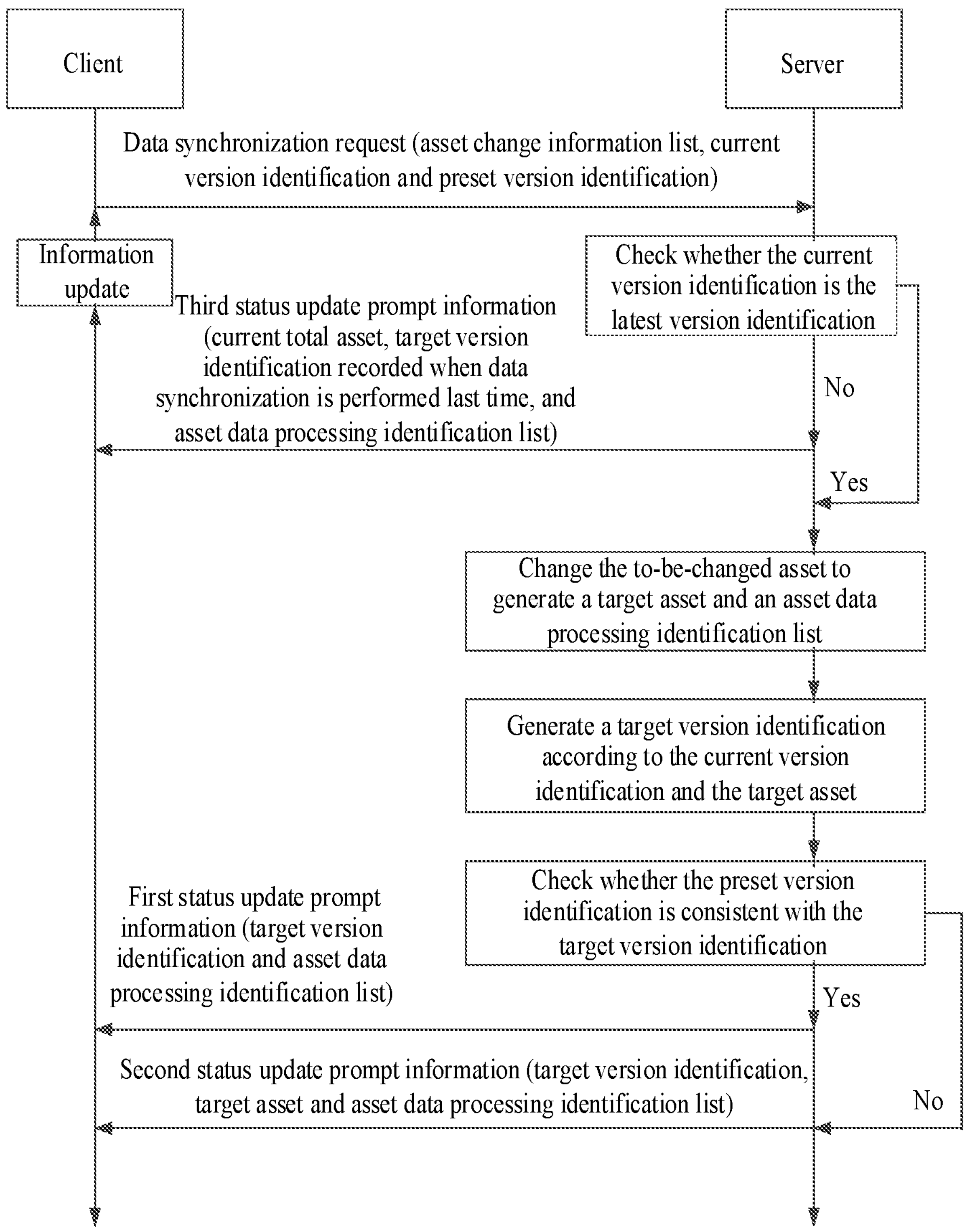
FIG. 5 is a schematic diagram of a data synchronization process according to an embodiment of the present disclosure.

In a specific embodiment, a player plays a weak networking game by using a mobile phone, and at this time, the mobile phone is not connected to the network. After a period of time, the mobile phone is connected to the network and starts to synchronize the data of the asset information related to the weak networking game. FIG. 5 is a schematic diagram of a data synchronization process according to an embodiment of the present disclosure. As shown in FIG. 5, the specific data synchronization process is as follows:

In a first step, after detecting that there is a network connection, the mobile phone determines a to-be-changed asset corresponding to the player, as well as a current total asset of the to-be-changed asset, an asset change information list and a current version identification.

In a second step, the mobile phone generates a preset version identification according to the current total asset of the to-be-changed asset and the asset change information list, and generates a data synchronization request according to the asset change information list, the current version identification and the preset version identification and sends it to the server.

In a third step, after receiving the data synchronization request submitted by the mobile phone, the server obtains a target version identification stored in the server recorded when the data synchronization is performed on the to-be-changed asset last time, and determines that the current version identification in the data synchronization request is consistent with the target version identification recorded when the data synchronization is performed last time, and determines that the current version identification is the latest version identification.

In a fourth step, the server changes the to-be-changed asset according to the asset change information list in the data synchronization request to generate a changed target asset and an asset data processing identification list.

In a fifth step, the server generates a target version identification according to the current version identification and the changed target asset, records the target version identification and the asset data processing identification list, and associates them with the data synchronization request.

In a sixth step, the server judges that the preset version identification in the data synchronization request is consistent with the target version identification.

In a seventh step, the server generates first status update prompt information according to the target version identification and the asset data processing identification list, and sends it to the mobile phone.

In an eighth step, the mobile phone updates the current version identification according to the target version identification, and updates the asset change information list according to the asset data processing identification list.

Figure 6:
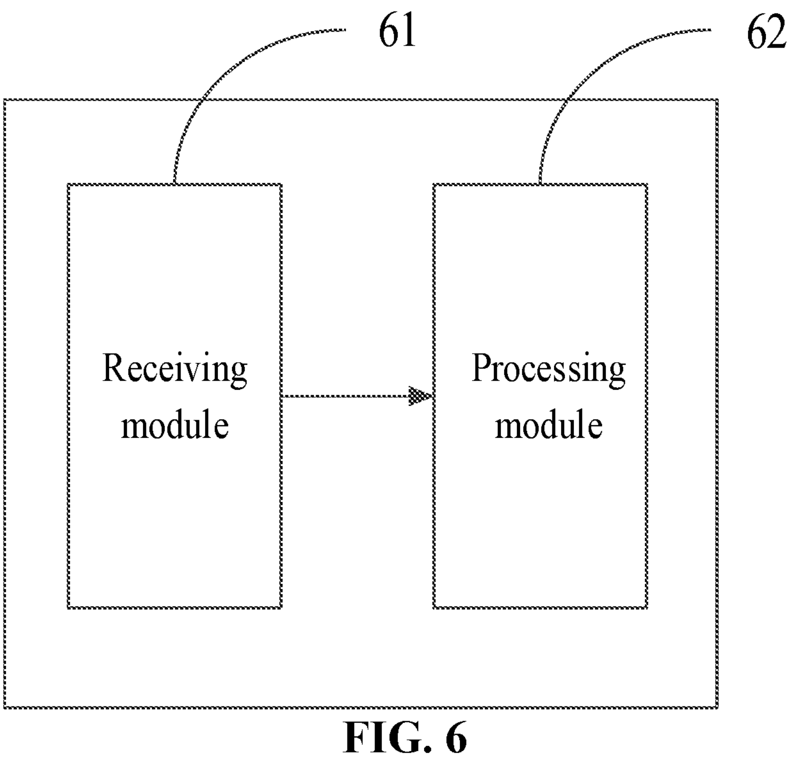
FIG. 6 is a schematic structural diagram of a server according to an embodiment of the present disclosure.

FIG. 6 is a schematic structural diagram of a server according to an embodiment of the present disclosure. As shown in FIG. 6, the server includes a receiving module 61, configured to receive a data synchronization request submitted by a client; a processing module 62, configured to determine whether a current version identification of a to-be-changed asset in the data synchronization request is a latest version identification; if yes, change the to-be-changed asset according to an asset change information list in the data synchronization request to generate a changed target asset; generate a target version identification according to the current version identification and the changed target asset; send a status update prompt information to the client according to the target version identification to prompt the client to update the asset change information list; where, the current version identification is a target version identification generated when the data synchronization is performed on the to-be-changed asset last time. In an implementation, for descriptions of the specific implementation function of the server, reference can be made to steps S101-S105 in embodiment 1 and steps S201-S204 in Embodiment 2, which are not repeated herein.

Figure 7:
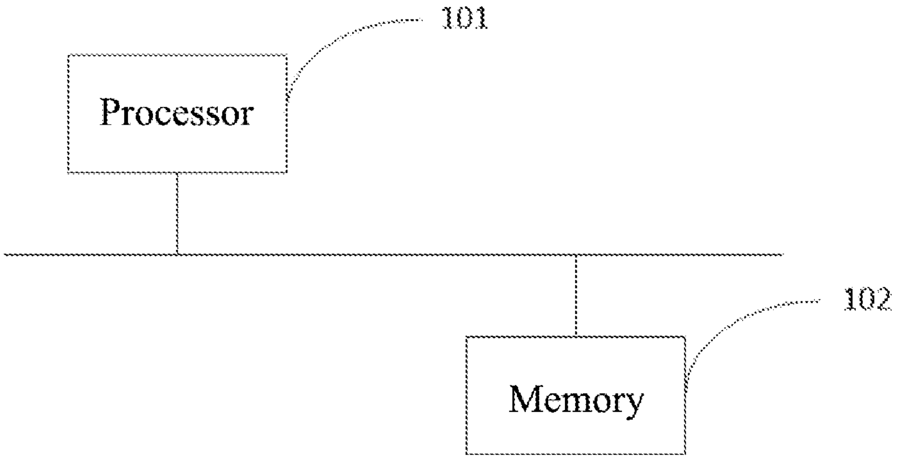
FIG. 7 is a schematic structural diagram of a server according to another embodiment of the present disclosure.

FIG. 7 is a schematic structural diagram of a server according to an embodiment of the present disclosure. As shown in FIG. 7, the server includes: a processor 101 and a memory 102 communicatively connected to the processor 101; where the memory 102 stores computer execution instructions; the processor 101 executes the computer execution instructions stored in the memory 102 to implement the steps of the data synchronization method in the above method embodiments.

In the above server, the memory 102 and the processor 101 are directly or indirectly electrically connected to realize data transmission or interaction. For example, these elements can be electrically connected with each other through one or more communication buses or signal lines, such as through a bus. The memory 102 stores computer execution instructions for implementing data synchronization methods, including at least one software functional module that can be stored in the memory 102 in the form of software or firmware. The processor 101 executes various functional applications and data processing by running software programs and modules stored in the memory 102.

The memory 102 can be, but is not limited to, a random access memory (RAM), a read only memory (ROM), a programmable read-only memory (PROM), an erasable programmable read-only memory (EPROM), an electric erasable programmable read-only memory (EEPROM), etc. The memory 102 is used to store programs, and the processor 101 executes the programs after receiving the execution instructions. Further, the software programs and modules in the above-mentioned memory 102 can also include an operating system, which can include various software components and/or drivers for managing system tasks (such as memory management, storage device control, power management, etc.), and can communicate with various hardware or software components to provide an operating environment for other software components.

The processor 101 can be an integrated circuit chip with signal processing capability. The processor 101 can be a general-purpose processor, including a central processing unit (CPU), a network processor (NP), and the like, which can realize or execute the methods, steps and logic blocks disclosed in the embodiments of the present disclosure. The general processor can be a microprocessor or this processor can be any conventional processor, etc.

An embodiment of the present disclosure further provides a computer-readable storage medium storing computer execution instructions which, when executed by a processor, are used to implement the steps of the method embodiments of the present disclosure.

An embodiment of the present disclosure further provides a computer program product including a computer program, and when the computer program is executed by a processor, the steps of the method embodiments of the present disclosure are implemented.

Other embodiments of the present disclosure will be easily conceived of by those skilled in the art after considering the specification and practicing the invention disclosed herein. The present disclosure is intended to cover any variations, uses or adaptations of the present disclosure, which follow the general principles of the present disclosure and include common knowledge or common technical means in the technical field that are not disclosed in the present disclosure. The specification and embodiments are to be regarded as illustrative only, with the true scope and spirit of the present disclosure being indicated by the appended claims.

It should be understood that the present disclosure is not limited to the precise structure that has been described above and shown in the drawings, and various modifications and changes can be made without departing from its scope. The scope of this application is limited only by the appended claims.

What is claimed is:

1. A data synchronization method, implemented by a server periodically synchronizing data with a client, comprising:

periodically receiving a data synchronization request submitted by the client, and determining whether a current version identification of a to-be-changed asset in the data synchronization request is a latest version identification; wherein the data synchronization request is generated and submitted by the client after the client detects that there is a network connection;

if yes, changing the to-be-changed asset according to an asset change information list in the data synchronization request to generate a changed target asset, wherein the asset change information list comprises an asset change item, to-be-changed asset data, a scene identification and an asset change identification corresponding to each asset change item;

generating a target version identification according to the current version identification and the changed target asset;

sending status update prompt information to the client according to the target version identification to prompt the client to update the asset change information list;

wherein the current version identification is a target version identification generated when data synchronization is performed on the to-be-changed asset last time;

wherein the changing the to-be-changed asset according to the asset change information list in the data synchronization request to generate the changed target asset comprises:

determining a current total asset of the to-be-changed asset;

for each asset change item in the asset change information list, determining the to-be-changed asset data, the scene identification and the asset change identification corresponding to the asset change item;

determining whether processing information corresponding to the asset change identification exists in a database;

if not, merging and changing the current total asset according to the to-be-changed asset data and the scene identification corresponding to the asset change item to generate a sub-asset corresponding to the asset change item;

if yes, skipping the asset change item and recording the asset change identification corresponding to the asset change item;

generating the changed target asset according to the sub-asset corresponding to each asset change item;

wherein the merging and changing the current total asset according to the to-be-changed asset data and the scene identification corresponding to the asset change item to generate the sub-asset corresponding to the asset change item comprises:

determining a business logic corresponding to the scene identification of the asset change item, and judging whether the to-be-changed asset data corresponding to the asset change item is reasonable according to the business logic;

if the to-be-changed asset data corresponding to the asset change item is reasonable, merging and changing the current total asset according to the to-be-changed asset data to generate a sub-asset corresponding to the asset change item; and if the to-be-changed asset data corresponding to the asset change item is unreasonable, sending request-resubmission instruction information to the client, wherein the request-resubmission instruction information is used to instruct the client to regenerate a data synchronization request according to reasonable to-be-changed asset data;

wherein the generating the target version identification according to the current version identification and the changed target asset comprises:

performing a Hash calculation on the current version identification and the changed target asset to obtain the target version identification.

2. The method according to claim 1, after merging and changing the current total asset according to the to-be-changed asset data to generate the sub-asset corresponding to the asset change item, further comprising:

generating an asset data processing identification according to the asset change identification corresponding to the to-be-changed asset data;

correspondingly, after generating the changed target asset according to the sub-asset corresponding to each asset change item, further comprising:

generating an asset data processing identification list according to each asset data processing identification.

3. The method according to claim 2, after generating the target version identification according to the current version identification and the changed target asset, further comprising:

recording the target version identification and the asset data processing identification list, and associating them with the data synchronization request.

4. The method according to claim 2, wherein the sending the status update prompt information to the client according to the target version identification comprises:

obtaining a preset version identification in the data synchronization request, wherein the preset version identification is calculated by the client according to the asset change information list and the current total asset of the to-be-changed asset stored in the client;

judging whether the target version identification is consistent with the preset version identification;

if yes, generating first status update prompt information according to the target version identification and the asset data processing identification list, wherein the first status update prompt information is used to instruct the client to update the current version identification according to the target version identification and update the asset change information list according to the asset data processing identification list;

if not, generating second status update prompt information according to the target version identification, the changed target asset and the asset data processing identification list, wherein the second status update prompt information is used to instruct the client to update the current version identification according to the target version identification, update the current total asset of the to-be-changed asset stored in the client according to the changed target asset, and update the asset change information list according to the asset data processing identification list.

5. The method according to claim 1, wherein the determining whether the current version identification of the to-be-changed asset in the data synchronization request is the latest version identification comprises:

obtaining a target version identification recorded in the server when the data synchronization is performed on the to-be-changed asset last time;

judging whether the current version identification is consistent with the target version identification recorded in the server when the data synchronization is performed last time;

if yes, determining that the current version identification is the latest version identification;

if not, determining that the current version identification is not the latest version identification.

6. The method according to claim 5, when the current version identification is not the latest version identification, further comprising:

determining a current total asset of the to-be-changed asset in the data synchronization request;

determining the target version identification and the asset data processing identification list recorded when the data synchronization is performed on the to-be-changed asset last time;

according to the current total asset of the to-be-changed asset, the target version identification and the asset data processing identification list recorded when the data synchronization is performed last time, generating third status update prompt information, wherein the third status update prompt information is used to instruct the client to:

update the current total asset of the to-be-changed asset stored in the client according to the current total asset of the to-be-changed asset stored in the server; update the current version identification of the to-be-changed asset according to the target version identification recorded when the data synchronization is performed last time; update the asset change information list according to the updated current total asset of the to-be-changed asset in the client and an asset data processing identification stored in the client; generate a new preset version identification according to the updated current total asset of the to-be-changed asset and the updated asset change information list; and generate a new data synchronization request according to the new preset version identification, the updated asset change information list and the updated current version identification, and send the new data synchronization request to the server.

7. The method according to claim 1, the determining the business logic corresponding to the scene identification of the asset change item comprises:

setting a corresponding business logic for each of scene identifications in advance to establish a correspondence table between scenes and business logics; and determining the business logic corresponding to the scene identification of the asset change item according to the correspondence table.

8. A server periodically synchronizing data with a client, comprising: a processor and a memory communicatively connected to the processor;

wherein the memory stores computer execution instructions;

the processor executes the computer execution instructions stored in the memory to:

periodically receive a data synchronization request submitted by the client, and determine whether a current version identification of a to-be-changed asset in the data synchronization request is a latest version identification; wherein the data synchronization request is generated and submitted by the client after the client detects that there is a network connection;

if yes, change the to-be-changed asset according to an asset change information list in the data synchronization request to generate a changed target asset, wherein the asset change information list comprises an asset change item, to-be-changed asset data, a scene identification and an asset change identification corresponding to each asset change item;

generate a target version identification according to the current version identification and the changed target asset;

send status update prompt information to the client according to the target version identification to prompt the client to update the asset change information list;

wherein the current version identification is a target version identification generated when data synchronization is performed on the to-be-changed asset last time;

when the processor executes the computer execution instructions stored in the memory to change the to-be-changed asset according to the asset change information list in the data synchronization request to generate the changed target asset, the processor further executes the computer execution instructions stored in the memory to:

determine a current total asset of the to-be-changed asset;

for each asset change item in the asset change information list, determine the to-be-changed asset data, the scene identification and the asset change identification corresponding to the asset change item;

determine whether processing information corresponding to the asset change identification exists in a database;

if not, merge and change the current total asset according to the to-be-changed asset data and the scene identification corresponding to the asset change item to generate a sub-asset corresponding to the asset change item;

if yes, skip the asset change item and record the asset change identification corresponding to the asset change item;

generate the changed target asset according to the sub-asset corresponding to each asset change item;

when the processor executes the computer execution instructions stored in the memory to merge and change the current total asset according to the to-be-changed asset data and the scene identification corresponding to the asset change item to generate the sub-asset corresponding to the asset change item, wherein the processor further executes the computer execution instructions stored in the memory to:

determine a business logic corresponding to the scene identification of the asset change item, and judge whether the to-be-changed asset data corresponding to the asset change item is reasonable according to the business logic;

if the to-be-changed asset data corresponding to the asset change item is reasonable, merge and change the current total asset according to the to-be-changed asset data to generate a sub-asset corresponding to the asset change item; and if the to-be-changed asset data corresponding to the asset change item is unreasonable, send request-resubmission instruction information to the client, wherein the request-resubmission instruction information is used to instruct the client to regenerate a data synchronization request according to reasonable to-be-changed asset data;

when the processor executes the computer execution instructions stored in the memory to generate the target version identification according to the current version identification and the changed target asset, the processor further executes the computer execution instructions stored in the memory to:

perform a Hash calculation on the current version identification and the changed target asset to obtain the target version identification.

9. The server according to claim 8, wherein the processor further executes the computer execution instructions stored in the memory to:

generate an asset data processing identification according to the asset change identification corresponding to the to-be-changed asset data;

wherein the processor further executes the computer execution instructions stored in the memory to:

generate an asset data processing identification list according to each asset data processing identification.

10. The server according to claim 9, wherein the processor further executes the computer execution instructions stored in the memory to:

record the target version identification and the asset data processing identification list, and associate them with the data synchronization request.

11. The server according to claim 9, wherein the processor further executes the computer execution instructions stored in the memory to:

obtain a preset version identification in the data synchronization request, wherein the preset version identification is calculated by the client according to the asset change information list and the current total asset of the to-be-changed asset stored in the client;

judge whether the target version identification is consistent with the preset version identification;

if yes, generate first status update prompt information according to the target version identification and the asset data processing identification list, wherein the first status update prompt information is used to instruct the client to update the current version identification according to the target version identification and update the asset change information list according to the asset data processing identification list;

if not, generate second status update prompt information according to the target version identification, the changed target asset and the asset data processing identification list, wherein the second status update prompt information is used to instruct the client to update the current version identification according to the target version identification, update the current total asset of the to-be-changed asset stored in the client according to the changed target asset, and update the asset change information list according to the asset data processing identification list.

12. The server according to claim 8, wherein the processor further executes the computer execution instructions stored in the memory to:

obtain a target version identification recorded in the server when the data synchronization is performed on the to-be-changed asset last time;

judge whether the current version identification is consistent with the target version identification recorded in the server when the data synchronization is performed last time;

if yes, determine that the current version identification is the latest version identification;

if not, determine that the current version identification is not the latest version identification.

13. The server according to claim 12, wherein the processor further executes the computer execution instructions stored in the memory to:

determine a current total asset of the to-be-changed asset in the data synchronization request;

determine the target version identification and the asset data processing identification list recorded when the data synchronization is performed on the to-be-changed asset last time;

according to the current total asset of the to-be-changed asset, the target version identification and the asset data processing identification list recorded when the data synchronization is performed last time, generate third status update prompt information, wherein the third status update prompt information is used to instruct the client to:

update the current total asset of the to-be-changed asset stored in the client according to the current total asset of the to-be-changed asset stored in the server; update the current version identification of the to-be-changed asset according to the target version identification recorded when the data synchronization is performed last time; update the asset change information list according to the updated current total asset of the to-be-changed asset in the client and an asset data processing identification stored in the client; generate a new preset version identification according to the updated current total asset of the to-be-changed asset and the updated asset change information list; and generate a new data synchronization request according to the new preset version identification, the updated asset change information list and the updated current version identification, and send the new data synchronization request to the server.

14. The server according to claim 8, wherein the processor further executes the computer execution instructions stored in the memory to:

set a corresponding business logic for each of scene identifications in advance to establish a correspondence table between scenes and business logics; and determine the business logic corresponding to the scene identification of the asset change item according to the correspondence table.

15. A non-transitory computer-readable storage medium, storing computer execution instructions, wherein the computer execution instructions are used by a server periodically synchronizing data with a client, so as to execute the following steps when executed by a processor:

periodically receiving a data synchronization request submitted by the client, and determining whether a current version identification of a to-be-changed asset in the data synchronization request is a latest version identification; wherein the data synchronization request is generated and submitted by the client after the client detects that there is a network connection;

if yes, changing the to-be-changed asset according to an asset change information list in the data synchronization request to generate a changed target asset, wherein the asset change information list comprises an asset change item, to-be-changed asset data, a scene identification and an asset change identification corresponding to each asset change item;

generating a target version identification according to the current version identification and the changed target asset;

sending status update prompt information to the client according to the target version identification to prompt the client to update the asset change information list;

wherein the current version identification is a target version identification generated when data synchronization is performed on the to-be-changed asset last time, and wherein the changing the to-be-changed asset according to the asset change information list in the data synchronization request to generate the changed target asset comprises:

determining a current total asset of the to-be-changed asset;

for each asset change item in the asset change information list, determining the to-be-changed asset data, the scene identification and the asset change identification corresponding to the asset change item;

determine whether processing information corresponding to the asset change identification exists in a database;

if not, merging and changing the current total asset according to the to-be-changed asset data and the scene identification corresponding to the asset change item to generate a sub-asset corresponding to the asset change item;

if yes, skipping the asset change item and recording the asset change identification corresponding to the asset change item;

generating the changed target asset according to the sub-asset corresponding to each asset change item;

wherein the merging and changing the current total asset according to the to-be-changed asset data and the scene identification corresponding to the asset change item to generate the sub-asset corresponding to the asset change item comprises:

determining a business logic corresponding to the scene identification of the asset change item, and judging whether the to-be-changed asset data corresponding to the asset change item is reasonable according to the business logic;

if the to-be-changed asset data corresponding to the asset change item is reasonable, merging and changing the current total asset according to the to-be-changed asset data to generate a sub-asset corresponding to the asset change item; and if the to-be-changed asset data corresponding to the asset change item is unreasonable, sending request-resubmission instruction information to the client, wherein the request-resubmission instruction information is used to instruct the client to regenerate a data synchronization request according to reasonable to-be-changed asset data;

wherein the generating the target version identification according to the current version identification and the changed target asset comprises:

performing a Hash calculation on the current version identification and the changed target asset to obtain the target version identification.

16. The non-transitory computer-readable storage medium according to claim 15 wherein the computer execution instructions are further used to execute the following step when executed by the processor:

setting a corresponding business logic for each of scene identifications in advance to establish a correspondence table between scenes and business logics; and determining the business logic corresponding to the scene identification of the asset change item according to the correspondence table.

* * * * *